F. E. GRIFFETH.
VEHICLE STEP SUPPORT.
APPLICATION FILED DEC. 26, 1916.
1,238,136.
Patented Aug. 28, 1917.
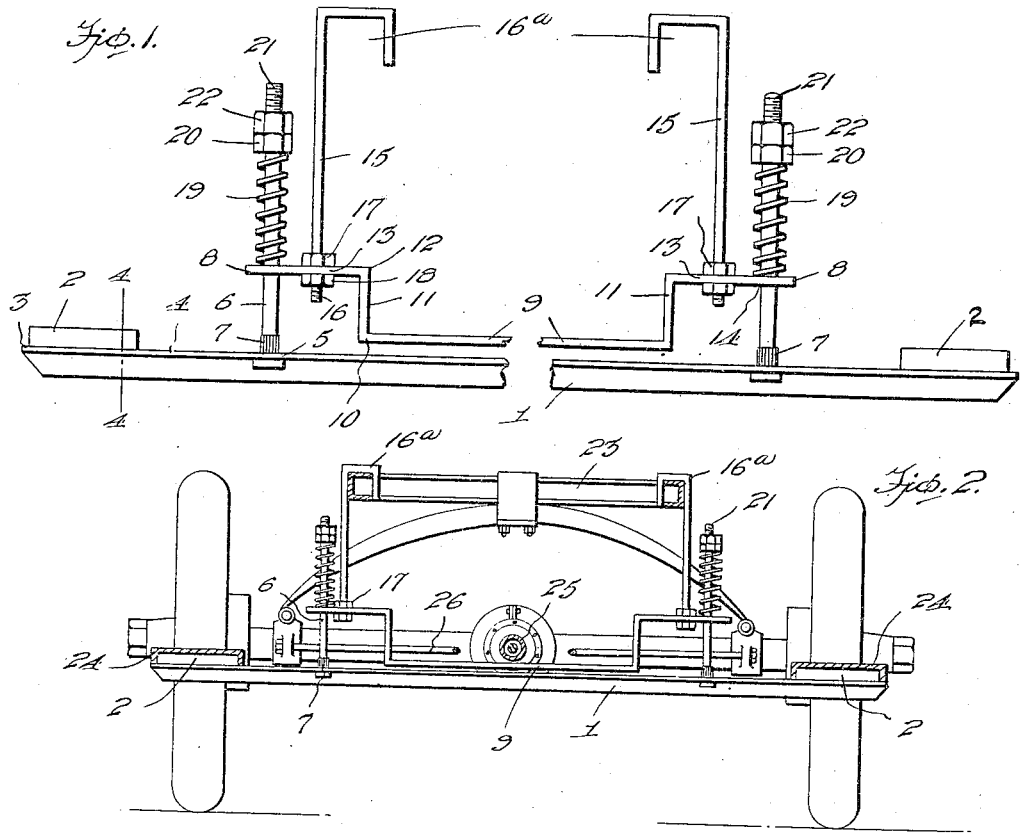
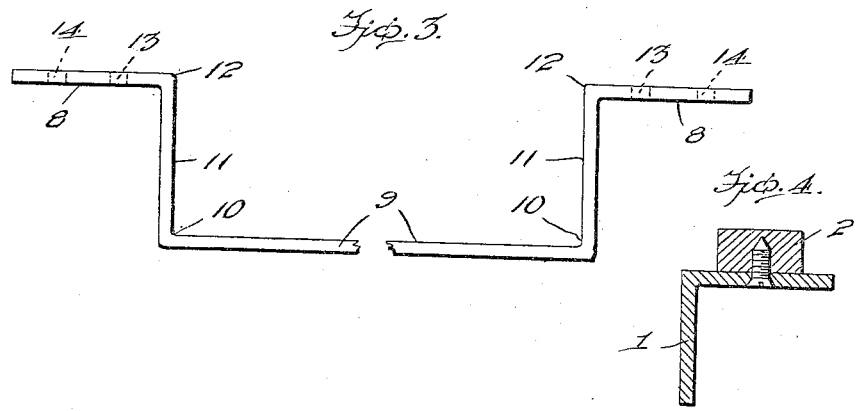
Witness
S. B. Michael
Francis E. Griffeth, Inventor
By Edson Bros, Attorneys

UNITED STATES PATENT OFFICE.

FRANCIS EMMET GRIFFETH, OF ATHENS, GEORGIA.

VEHICLE-STEP SUPPORT.

1,238,136.   Specification of Letters Patent.   Patented Aug. 28, 1917.

Application filed December 26, 1916. Serial No. 138,899.

*To all whom it may concern:*

Be it known that I, FRANCIS E. GRIFFETH, a citizen of the United States, residing at Athens, in the county of Clarke and State of Georgia, have invented certain new and useful Improvements in Vehicle-Step Supports; and I do hereby declare the following to be a full, clear, and exact description of the invention, such as will enable others skilled in the art to which it appertains to make and use the same.

This invention relates in general to supports for vehicle steps, and is adapted more particularly for use in connection with the side steps or running boards of automobiles.

It has been found in practice that the iron supports suspended rigidly from the frame of an automobile to support the running boards and fenders thereof, become gradually bent with continued use, allowing the running boards and fenders to sag or droop. This is seriously objectionable, owing to the unsightly appearance it causes, and also because of the noises and rattle of the parts thus affected while the machine is in motion.

With these facts in mind, the object of the invention is to produce an inexpensive and simple device which can be readily applied to an automobile without detaching or removing any of the parts or equipment of the vehicle, and which, when applied to said vehicle, will restore loose or sagging running boards to their proper position and retain them in this position, at the same time eliminating all noise and rattle caused by the jarring of the loose parts connected with the running board and supports thereof, while the machine is in motion.

With this and other objects in view that will more fully hereinafter appear, the invention consists of certain novel details of construction and arrangement of parts, hereinafter fully described, illustrated in the accompanying drawings, and pointed out more particularly in the appended claims; it being understood that various changes in form, proportion, size and minor details of the device may be made within the scope of the appended claims without departing from the spirit or sacrificing any of the advantages of the invention.

In the accompanying drawings:—

Figure 1 is a front elevation of my support.

Fig. 2 is a view partly in section, showing my device applied to the chassis of an automobile.

Fig. 3 is a detail view of the angular bar 9.

Fig. 4 is a section taken on the line 4—4 of Fig. 1, showing means of attaching the cleats to the horizontal bar.

Similar reference numerals are used to designate like parts throughout.

The invention comprises a rigid bar 1, preferably of L cross-section, shown in Fig. 4, and generally known as angle iron, provided with lugs or cleats 2 of wood or other suitable material positioned adjacent the ends of bar 1, and secured to it by screws as seen in Fig. 4, a small space 3 being preferably left between the ends of the cleats 2 and the ends of the bar 1, said space adapted to engage the downturned edge 27 of the running board 24, as shown in Fig. 2.

At equal distances 4 from the inside ends of the cleats 2, the bar 1 is provided with holes 5 adapted to receive bolts 6 which are provided with means to prevent their rotation with respect to the bar 1. This means may be in the form of an enlarged shank immediately adjacent the head of the bolt, said shank being ridged or corrugated as shown at 7, to engage the edges of the holes 5, or any other suitable means. The bolts 6 extend vertically through the holes 5 in the bar 1, and at right angles to it, and slidably engage the ends 8 of the bar 9 by means of the holes 14 in said ends 8. This bar is of a form best shown in Fig. 3, being formed preferably from a single bar of metal bent at points 10 equidistant from its ends 8 at right angles, so that the portions 11 of the bar extend parallel to each other, and in the same direction; thence, bent at right angles at a point 12, the ends 8 thereby lying in the same straight line by pointing in the opposite directions and are parallel to the bar 1, and also to the central portion of the bar 9.

The raised ends 8 of the bar 9 are provided with a plurality of holes 13 and 14; the holes 14 are adapted to receive the bolts 6 for their engagement with the bar 9, and the holes 13 are adapted to receive a plurality of upstanding rods 15 having their lower extremities 16 threaded to receive a plurality of nuts 17 and 18. These nuts are positioned adjacent opposite sides of the end portions 8 of the bar 9, so that by drawing them tightly against the opposite sides of the ends 8, the upstanding rods 15 are held in rigid and vertical position with respect to the bar 9. The rods 15 are provided at their upper extremity with angular hook members 16ª, the purpose of which will be hereinafter fully described.

Above and upon the ends 8 of the bar 9 and loosely mounted upon the bolts 6 are a plurality of helical spring members 19, said spring members being engaged at their upper ends by nuts 20 mounted on the threaded ends 21 of the bolts 6, the nuts 20 being locked in their properly adjusted position by the jam-nuts 22, as will be hereinafter described.

To apply this device to an automobile the upright rods 15 are removed from the device by removing the nuts 18. The rods are then suspended by their hooked portions 16ª from the frame of the machine, designated at 23, and shown clearly in Fig. 2. The bar 9, together with the bar 1 is then applied to the suspended rods 15, the ends 16 being led through the holes 13 in the ends 8 of the bar 9, and the nuts 18 being replaced and turned tightly against the ends of the bar. The jam-nuts 22 are then loosened and the nuts 20 adjusted against the energy of the springs 19 until the cleats 2 come into proper engagement with the running boards indicated at 24, and clearly shown in Fig. 2 of the drawings. The nuts 20 are then locked in their adjusted position by means of the jam-nuts 22.

From the disclosures in Fig. 2, it will be seen that the vertical portions 11 of the rod 9 serve to keep the device clear and out of plane of the drive-shaft 25 and the torque or radius rods 26 of the automobile.

From the foregoing description, it will be seen that a simple and inexpensive device has been produced which is quickly and easily applied to an automobile without disturbing any of the equipment of the vehicle, and which when applied to a vehicle in the manner above described and illustrated in the accompanying drawings, will provide a substantial and resilient support for the running boards of the vehicle, will prevent the rigid step supporting members of the vehicle becoming bent, allowing the running boards to sag, will restore loose or sagging running boards to their proper positions, and will eliminate all objectionable noise or rattle of such parts when the vehicle is in motion.

Having thus fully and clearly described my invention, what I claim is:—

1. A device of the class described comprising a bar, a plurality of cleats and a plurality of upstanding members mounted thereon, a second bar slidably mounted on said upstanding members, said second bar provided with a plurality of upstanding members, resilient means mounted on the upstanding members of the first bar and means to retain said resilient means and said second bar upon the upstanding members of the first bar.

2. A device of the class described, comprising a bar, a plurality of cleats mounted thereon adjacent the ends thereof, a plurality of upstanding members loosely mounted on said bar equidistant from the ends thereof, a second bar slidably mounted on said upstanding members, a plurality of upstanding members rigidly mounted on said second bar, said upstanding members terminating in angular hooked portions, resilient means loosely mounted on the upstanding members of the first bar, and means on said upstanding members to adjust the second bar with respect to the first bar.

3. A device of the class described, comprising a bar, a plurality of cleats mounted thereon equidistant from the ends thereof, a plurality of upstanding members loosely mounted on said bar, and means to prevent the rotation of said upstanding members with respect to the bar, a second bar mounted above the first bar slidably engaging the upstanding members of the first bar, the ends of said second bar lying in the plane above that of the central portion of the bar, but parallel thereto, a plurality of upstanding hooked members provided with threaded lower extremities, a plurality of nuts mounted thereon, a plurality of helical spring-members loosely mounted on the upstanding members of the first bar, and means mounted on said upstanding members to adjust the second bar with respect to the first bar and to lock said second bar in said adjusted position.

4. A device of the class described, comprising a horizontal bar, a plurality of cleats mounted rigidly thereon adjacent the ends thereof and equidistant therefrom, a plurality of upstanding members mounted on said bar equidistant from the ends thereof, means to prevent the rotation of said upstanding members with respect to the bar, a second bar positioned above the first bar and parallel thereto, the ends of said second bar lying in a plane substantially above that of its central portion, a plurality of upstanding members rigidly but removably mounted upon the raised ends of the second bar, equidistant from the ends thereof, said upstanding members terminating in angular hooks, a plurality of helical spring members loosely mounted on the upstanding members of the first bar and means upon said upstanding members to adjust the second bar vertically with respect to the first bar and means to lock the second bar in one of a plurality of predetermined adjusted positions.

In testimony whereof, I affix my signature, in presence of two witnesses.

FRANCIS EMMET GRIFFETH.

Witnesses:
J. T. GRIFFETH,
EMILY BISSON.

Copies of this patent may be obtained for five cents each, by addressing the "Commissioner of Patents, Washington, D. C."